March 1, 1966  R. J. FORD ETAL  3,237,697
HELICOPTER ROTOR BLADE
Filed Feb. 11, 1963  5 Sheets-Sheet 1
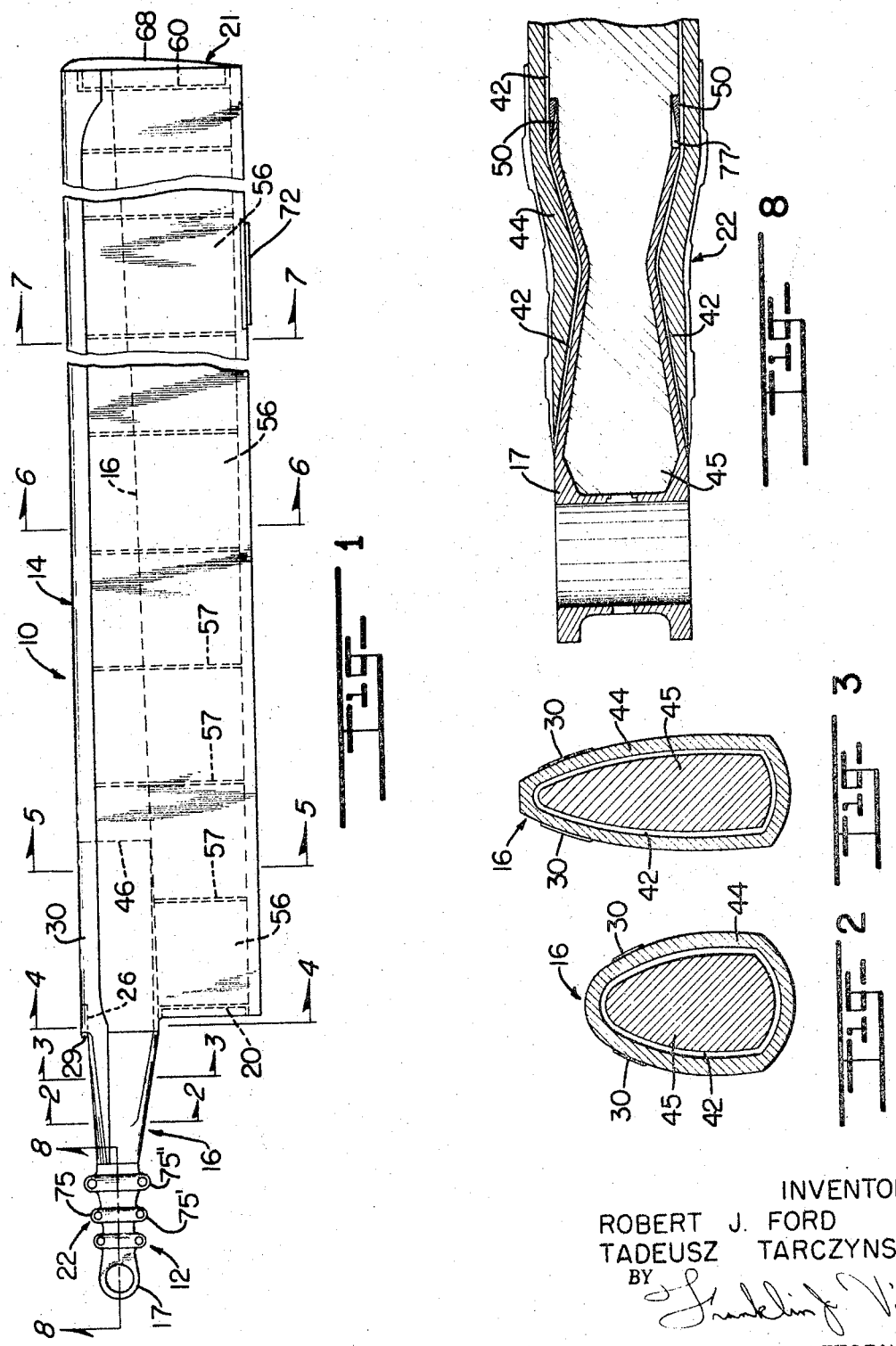
INVENTORS
ROBERT J. FORD
TADEUSZ TARCZYNSKI
BY
ATTORNEY

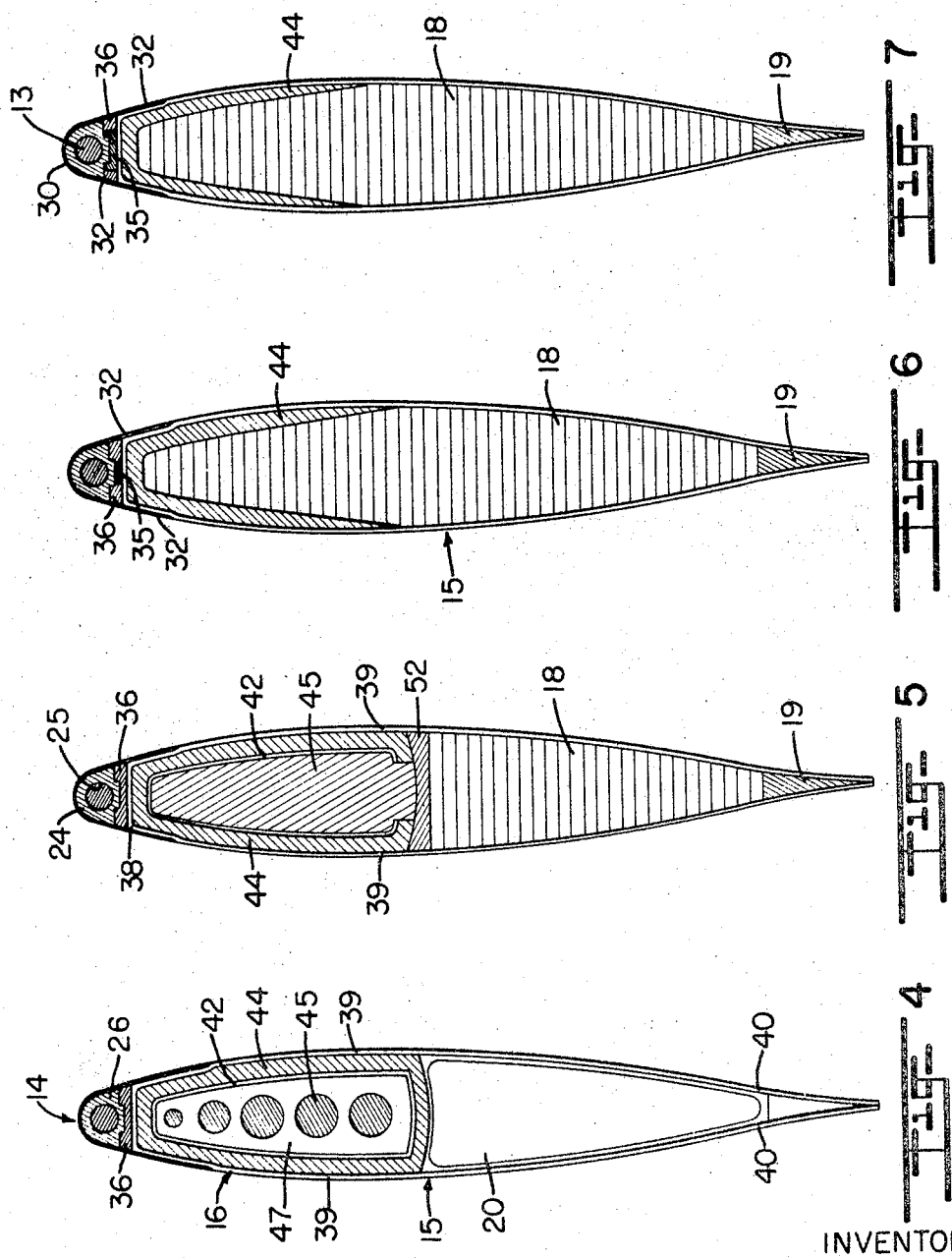

March 1, 1966 R. J. FORD ETAL 3,237,697
HELICOPTER ROTOR BLADE
Filed Feb. 11, 1963 5 Sheets-Sheet 3
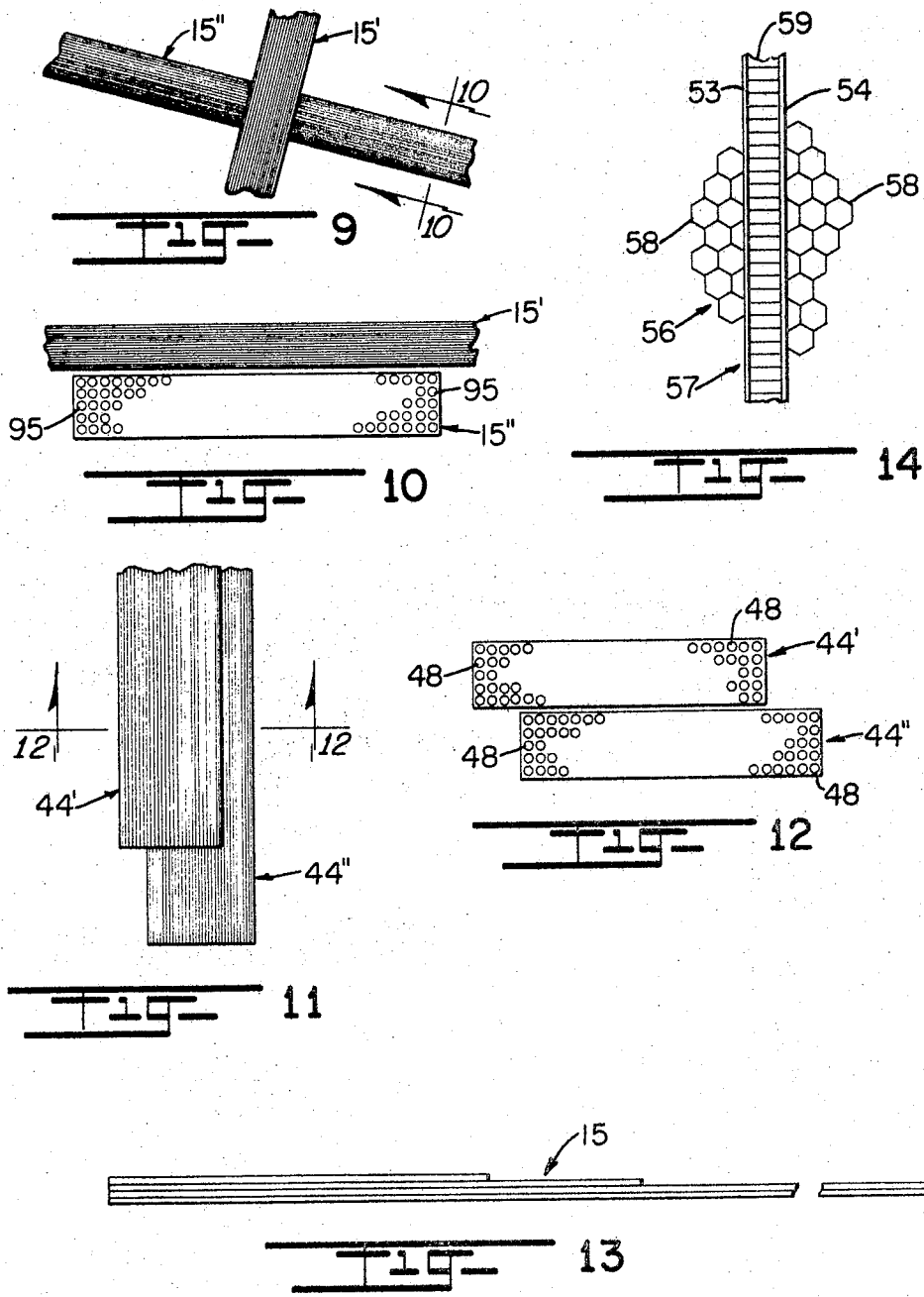
INVENTORS
ROBERT J. FORD
TADEUSZ TARCZYNSKI
BY
ATTORNEY

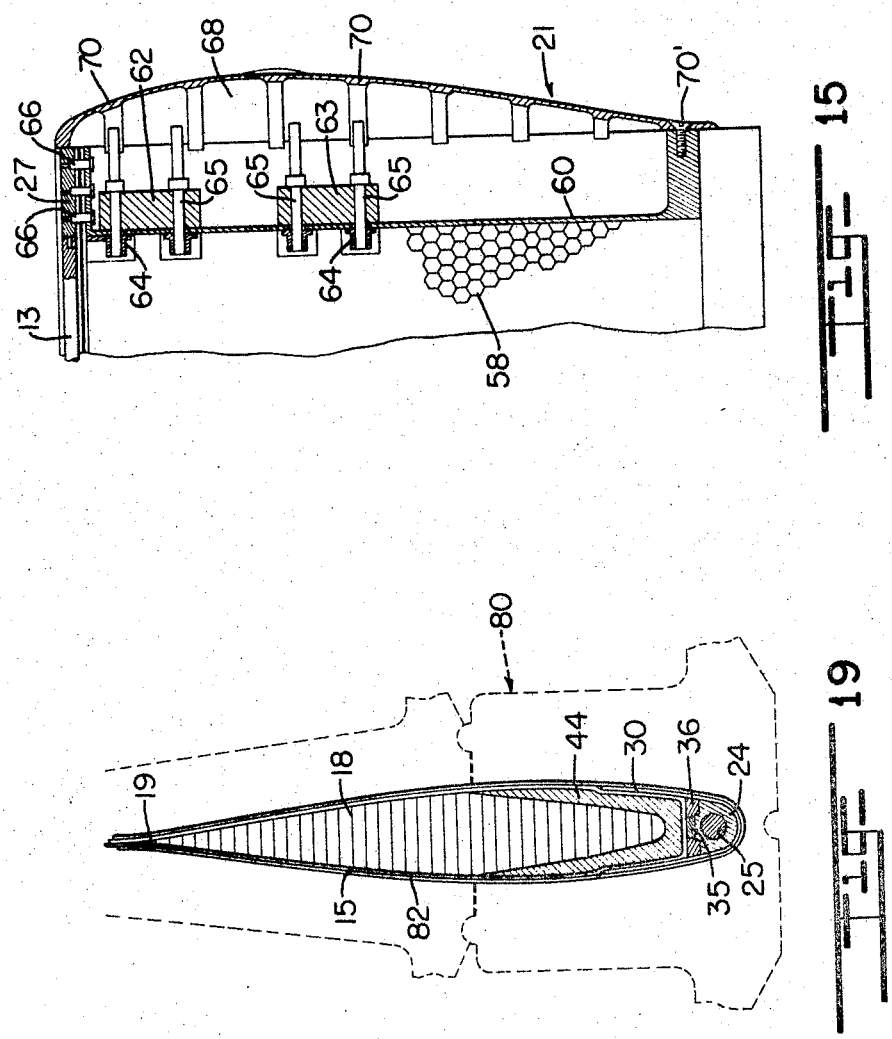

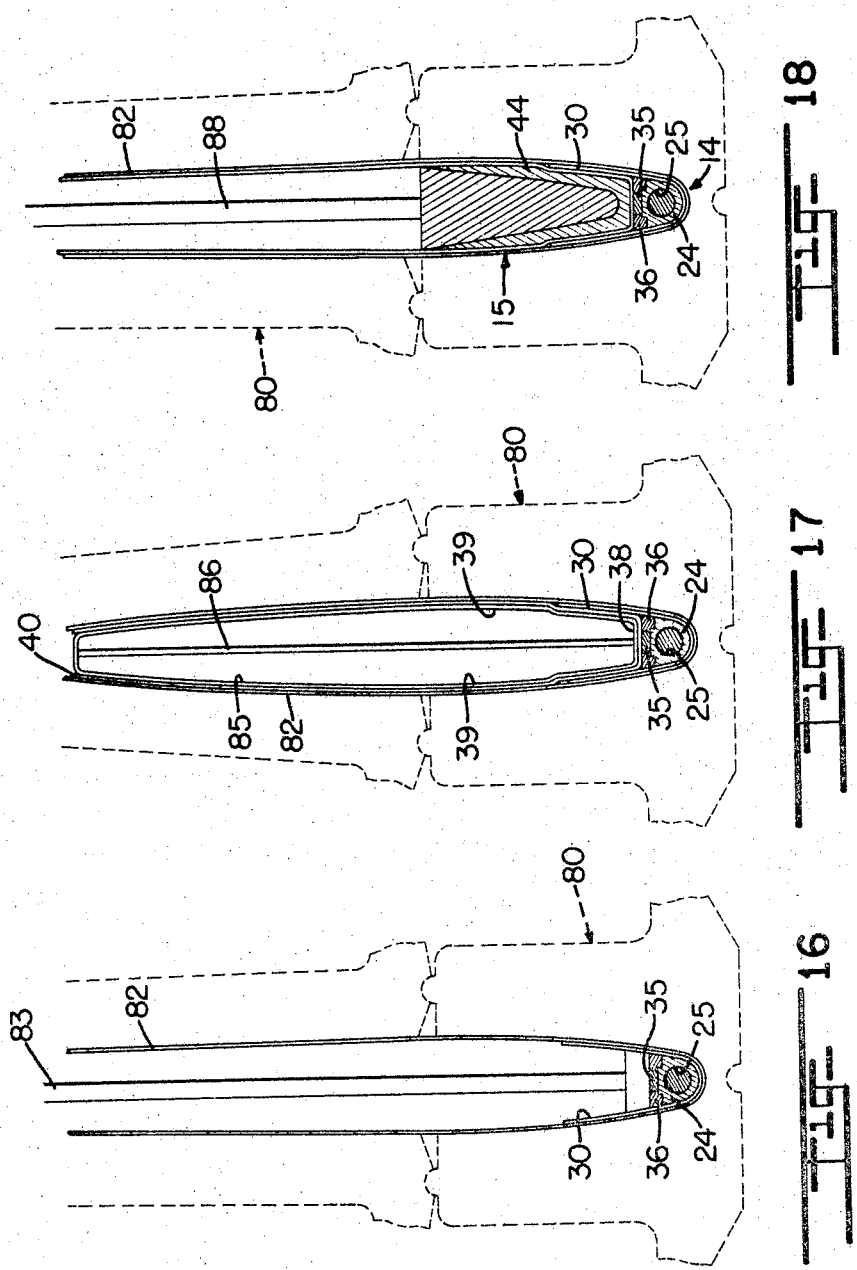

3,237,697
HELICOPTER ROTOR BLADE
Robert J. Ford, Folsom, and Tadeusz Tarczynski, Upper Darby, Pa., assignors to The Boeing Company, Seattle, Wash., a corporation of Delaware
Filed Feb. 11, 1963, Ser. No. 257,546
11 Claims. (Cl. 170—159)

This invention relates to a new and improved airfoil structure as well as to a method of manufacture and, more particularly, to the manufacture and construction of lightweight rotor blades for rotary wing aircraft in which moldable reinforced materials are utilized in a unique manner to lend the necessary directional strength characteristics to the blade.

The general advancement of rotary wing technology has resulted in increased requirements for the rotor blades employed on rotary wing aircraft. It has been a need in the art of rotary blades to develop rotor blades, which are economical to manufacture, non-corrosive, and characterized by improved fatigue properties. Additionally, rotor blades have been desired, which have the characteristic of being lighter in weight per unit area of lift surface while having the required stiffness and strength. Accordingly, the advance of the technology of plastics has given impetus to development of a plastic rotor blade, which is characterized by the above enumerated advantages. This invention relates to such a rotor blade.

In accordance with preferred practice of the present invention, it has been found that the art of plastic rotor blade manufacture can be vastly improved by selective orientation of plies of moldable laminated materials reinforced with unidirectionally aligned filaments such as glass, yarn, or metal. This is in contradistinction to the use of fabric or woven materials as reinforcements. That is, the fill (threads perpendicular to the primary strength filaments) of the fabric or woven reinforcements offers some support but little strength to the reinforcement, and actually represents wasted and unnecessary weight. Also, when incorporated in moldable materials utilized in the manufacture of the rotor blades, the fill tends to cause a notch effect, which is not encountered with unidirectional filaments. Accordingly, the term "plastic reinforced materials" as used herein has particular relation to plastic or resinous materials incorporating unidirectionally aligned, non-woven filaments.

In this connection, various commercially available materials such as plastic or resinous sheet materials reinforced with linearly aligned glass or cord filaments may be employed in accordance with the present invention. One suitable material for this purpose is a reinforced plastic, Type 1002, manufactured and sold by Minnesota Mining and Manufacturing Co. under the trademark "Scotchply." Although the properties and characteristics of this material are described in more detail in Bulletin No. 2A, dated December 1, 1957, published by Minnesota Minning and Manufacturing Co., it is essentially a moldable epoxy laminate reinforced with continuous, non-woven glass filaments. This material is available either in single plies with the filaments running unidirectionally, or in multiple plies with the filaments arranged in biased relation. Each ply is about 0.010 inch thick. Under heat and pressure the material becomes thermoplastic and the plies are highly susceptible to bonding together into unitary relation.

The present invention utilizes plies of plastic reinforced materials for forming portions of a rotary blade and, particularly, the spar assembly and the cover or skin thereof. The plies are laminated and bonded together to obtain plastic members with filaments running either in biased or unidirectional relation to the filaments of adjacent plies. Further, the plies of the blade skin are arranged in staggered relation throughout the length of the blade according to the desired strength, weight, and contour requirements for the blade. The plies also are combined with other lightweight elements in a unique manner to lend the desired directional strength characteristics to the blade at various points throughout and to form a resultant blade of unitary structure.

It is an object of the present invention to provide an airfoil structure, such as, a rotor blade having optimum strength per unit weight as well as improved loading and fatigue properties, while at the same time affording the desired flexibility in use.

It is another object of the present invention to make provision for an improved spar assembly, which is specially designed and constructed to lend better balance and strength characteristics to an airfoil structure, as well as a combined spar and skin assembly capable of effectively absorbing severe loads and stresses imparted to the airfoil structure.

A further object is to provide a rotor blade for use in rotary wing aircraft incorporating an improved connecting means for interconnecting the airfoil and root end sections to form a unitary structure capable of withstanding centrifugal forces, and torsional forces between the airfoil and root end sections; wherein the invention makes provision for the use of plies of moldable sheet materials incorporating reinforcing elements therein, which can be selectively oriented to withstand forces and loads imparted to the blade in use and are combined in relation to one another to produce a rotor blade which is lightweight, durable, and aerodynamically smooth with improved balance and fatigue characteristics.

A still further object is to provide for a process of manufacturing airfoil structures that is low cost, efficient, and requires a minimum number of steps; furthermore, the method of the invention utilizes the directional strength characteristics of reinforced plastic material to produce a lightweight airfoil structure having laminations of the plastic material selectively oriented and arranged to most effectively absorb stresses and loading therein.

An additional object is to provide for a method of manufacturing plastic rotor blades for rotary wing aircraft following a unique sequence of steps in which the elements thereof are united in a single forming tool having a variable contour and wherein the rotor blade, subsequent to formation, may be balanced to establish the desired center of gravity and weight distribution.

Other objects of this invention will be readily perceived from the following description, drawings, and claims.

This invention relates to a longitudinally extending spar assembly in a structure of airfoil contour. The longitudinally extending spar assembly includes plies of plastic material reinforced with unidirectionally and longitudinally extending filaments therein for absorbing centrifugal forces imposed on the structure.

This invention further relates to a longitudinally extending cover layer in a structure of airfoil contour. The longitudinally extending cover layer includes plastic material reinforced with a plurality of layers of filaments positioned in biased relationship with respect to adjacent layers thereof.

Additionally, this invention relates to a composite aircraft blade structure comprising a skin layer, a leading edge assembly, a spar, and a core. The spar traverses the substantial length of the blade structure and includes plies of a moldable material reinforced with unidirectionally and longitudinally extending filaments. The core is composed of a lightweight material and at least the core and a portion of the spar are in juxtaposed relation within the skin layer in bonded relation with respect to the skin layer.

Further, this invention also relates to a composite rotor blade structure adapted for use in rotary wing aircraft. The rotor blade structure comprises a cover layer including reinforced moldable material, a leading edge assembly and a spar assembly. The spar assembly substantially traverses the length of the blade structure and includes plies of reinforced moldable material. A core bonded to the spar assembly and to the cover layer, and root end means for providing support to the blade structure is engaged with the spar assembly. Further, support means are included for further holding the root end means and the spar assembly in engagement, and the spar assembly and the leading edge assembly are bonded to the cover layer.

This invention also relates to a method of forming a structure of airfoil contour in which a leading edge assembly is placed within a mold cavity defining the exterior contour of the structure. The method further includes the steps of forming a skin section by placing plies of moldable reinforced material within the mold cavity to provide a leading end behind the leading edge assembly and trailing ends extending along opposite walls of the mold cavity, and bonding the skin section and the leading edge assembly together. Additionally, a spar assembly is positioned in the mold and against the leading end of the skin section. Further, the method includes the steps of filling substantially the remainder of the space within the skin section and the spar assembly with lightweight material and bonding the skin section, the leading edge assembly, the spar assembly, and the lightweight material to form a structure having an airfoil contour conforming to that of the mold cavity.

Furthermore, this invention relates to a method of forming a spar assembly for a blade structure of airfoil contour having a connecting member at one end thereof. The method comprises the steps of pre-forming a spar support portion of elongated cylindrical configuration and in connected relation to the connecting member, and placing plies of reinforced plastic material in surrounding relation to the spar support member with the reinforcement of at least a portion of the plies extending unidirectionally, and substantially parallel to the longitudinal axis of the spar support member and the blade structure. These steps are followed by the step of molding the spar support member and the plies into unitary relation.

The attached drawings illustrate a preferred embodiment of the invention, in which:

FIGURE 1 is a plan view of the present invention in the form of a rotor blade for rotary wing aircraft;

FIGURE 2 is a sectional view taken on line 2—2 of FIGURE 1;

FIGURE 3 is a sectional view taken on line 3—3 of FIGURE 1;

FIGURE 4 is a view partly in section taken on line 4—4 of FIGURE 1;

FIGURE 5 is a sectional view taken on line 5—5 of FIGURE 1;

FIGURE 6 is a sectional view taken on line 6—6 of FIGURE 1;

FIGURE 7 is a sectional view taken on line 7—7 of FIGURE 1;

FIGURE 8 is a longitudinal sectional view of the root end socket taken on line 8—8 of FIGURE 1;

FIGURE 9 is a schematic view of plies of plastic material in biased relation;

FIGURE 10 is a schematic sectional view taken on line 10—10 of FIGURE 9;

FIGURE 11 is a schematic view of plies of plastic material in unidirectionally aligned relation;

FIGURE 12 is a schematic sectional view taken on line 12—12 of FIGURE 11;

FIGURE 13 is an enlarged, fragmentary view illustrating the staggered relation between plies of material forming the outer skin of the rotor blade in accordance with the present invention;

FIGURE 14 is an enlarged, fragmentary view of a preferred form of core section employed in accordance with the present invention;

FIGURE 15 is an enlarged, fragmentary view, partially in section, of the outboard end of the blade portion and the tip end assembly;

FIGURE 16 is an end view representing the relative disposition between parts in the formation of the leading edge section assembly according to the method of the present invention.

FIGURE 17 is an end view illustrating the relative disposition between parts in the formation of the outer layer according to the method of the present invention;

FIGURE 18 is an end view illustrating the relative disposition between parts in a mold for forming the spar asesembly; and FIGURE 19 is an end view representing the relative disposition and arrangement between parts in the final molding stage according to the method of the present invention.

Referring to the drawings and particularly FIGURE 1, there is shown an airfoil structure, which broadly comprises a blade portion 10 of an airfoil contour and a root end portion 12. As seen in FIGURES 1 and 4 to 7, the blade portion 10 includes a leading edge assembly 14, a main supporting element in the form of a spar assembly 16 and blade skin or cover layer 15.

The spar assembly 16 is enclosed by the skin 15 and secured at its inboard end to a root end socket 17, and a lightweight filler element or core 18 is enclosed within the skin 15 and the spar assembly 16. The trailing edges of the skin 15 are bonded to a trailing edge wedge 19 to captivate the core 18. The core 18 and the trailing edge wedge 19 tranverse substantially the entire length of the blade portion 10 and terminate at a root rib 20 and a tip end assembly 21 at the inboard end and the outboard end, respectively. Additionally, a clamp 22 is employed on the root end 12 of the blade structure for providing structural support and connection means for a damper (not shown).

Preferably, the leading edge assembly 14 is positioned exteriorly of the skin layer 15 and traverses the entire leading edge of the blade portion 10. Accordingly, the leading edge assembly 14 provides a rugged exterior portion resistant to the detrimental effects of the environment encountered during use. Essentially, the leading edge assembly 14 comprises an abrasion strip 30 of, for example, stainless steel and a rounded nose portion 24, which defines the contour of the leading edge of the blade.

The nose portion 24 is formed of a rugged plastic material and has a longitudinal bore 25, which extends therethrough for receiving a tapered, removable balance rod or weight 13. The abrasion strip 30 is applied over the rounded nose 24 for providing an outer protective surface and has trailing edges 32, which terminate in overlapping relation with the leading end of the skin 15.

A bearing block 26 is positioned at the inboard end of the nose portion 24, and a stop member 27 (see FIGURE 15) is positioned at the outboard end thereof. The bearing block 26 and the stop member 27 fixedly hold the balance rod 13 within the bore 25 of the nose portion 24. That is, an end nut 29 (see FIGURE 1) is threaded to an inboard portion of the balance rod 13 that extends through a bore in the bearing block 26, which has the same configuration as the nose portion 24. However, the bearing block 26 is formed of a stronger material than the nose portion 24 in order to withstand centrifugal forces from the balance rod 13 during rotor blade use. Accordingly, the stop member 27 coacts with the bearing block 26 to counteract the centrifugal forces on the balance rod 13.

The leading edge assembly 14 includes a mass balance weight 35, which is permanently secured to the nose portion 24 by means of a plastic filler 36. The weight 35 tapers as it extends inboard from the outboard end of the blade, and it traverses the greater length of the blade to approximate the necessary balance of the blade. Of course, since the filler 36 need not withstand torsional stresses it is formed from plastic plies having unidirectionally aligned filaments.

It should be understood that the balance rod 13 is preferably tapered or formed as desired to achieve the necessary blade balance and inserted into the bore 25 after the blade is formed. Additionally, the balance rod is tapped at its outboard end to facilitate removal thereof.

The covering of the blade portion defined by the skin 15 is composed of a plurality of plies of a plastic or resinous material reinforced with linearly aligned filaments. In the skin layer 15, the plies, such as plies 15' and 15" of FIGURE 9, are preferably arranged with the filaments of adjacent plies extending in biased relation to one another. For the purpose of illustration and as shown schematically in FIGURE 9, the bias angle may be on the order of 90 degrees between the reinforcing elements of each adjacent ply. Accordingly, the reinforcing filaments extend at an angle on the order of 45 degrees with respect to the leading and trailing edges of the blade when laid longitudinally thereof. It should be understood that each ply contains a plurality of non-woven filaments such as filaments 95, as seen in FIGURE 10. Each filament 95 of a ply extends linearly and unidirectionally with respect to each other filament of its ply. Accordingly, since the plies of the skin layer 15 are laid in biased relationship, the filaments 95 of a first ply, such as 15', extend in biased relationship with respect to the filaments of adjacent plies, such as ply 15", when bonded together. Further, it should be understood that the plies, such as plies 15' and 15", are laid and bonded so as to approximate the contour desired.

Additionally, as best seen in FIGURE 13, the plies of the skin layer or skin 15 are laid in staggered, lengthwise relation along the length of the blade portion to achieve the desired blade weight and torsional stiffness, as well as the desired contour of the blade portion 10. In cross-section, as shown in FIGURES 4 to 7, the skin 15 comprises a leading edge portion 38 abutting against the leading edge assembly 14 and enclosed within the abrasion strip 30 along with rearwardly extending surfaces 39, which terminate in rearwardly convergent trailing end surfaces 40.

The spar assembly 16 traverses the entire length of the rotor blade and is defined by a plurality of plies 42 and 44 (see FIGURES 2, 3, and 8). Additionally, the plies 44 are composed of plastic reinforced material and the reinforcements thereof extend the entire length of the blade structure from the root end socket 17 to the outer tip end assembly 21.

As may be clearly seen by reference to FIGURE 8, the root end socket 17 has an hour-glass shaped portion upon which the plies 42 and 44 are laid in surrounding relation so as to form a generally hour-glass shaped section. Thereafter, the plies 42 and 44 continue outwardly in the form of a closed circular cross-section (see FIGURE 2) and then in the form of a "D"-spar cross-section (see FIGURES 3 and 4). However, as noted from FIGURES 5 to 7, the plies 44 undergo a transition from the "D"-spar to a "C"-spar configuration. The spar gradually decreases in thickness so as to taper outwardly from the inboard end to the tip end of the blade.

Since the spar is the main load-carrying element of the blade, each of the plies 44 thereof is preferably reinforced with longitudinally extending, linearly aligned non-woven filaments in closely spaced relation so as to effectively absorb centrifugal forces imparted to the blade during use. That is, in the spar portion comprised of the plies 44, plies such as plies 44' and 44" are preferably arranged with the non-woven filaments of adjacent plies extending unidirectionally with respect to each other.

For the purpose of illustration and, as shown schematically in FIGURE 11, spar plies, such as plies 44' and 44", are laid in unidirectional relation and each contains a plurality of non-woven filaments such as filaments 48 (see FIGURE 12). The filaments in each ply are linear and unidirectional. Accordingly, the filaments of a ply, such as ply 44', are in unidirectional relation to the filaments of an adjacent ply, such as the ply 44". Further, it should be understood that the plies 44' and 44" are laid and bonded so as to approximate the contour desired.

As illustrated in FIGURES 2, 3 and 8, an inner core mandrel or support member 45 is positioned within the root end socket 17 in order to locate the layup of the plies 42 and 44 at the outboard end of the blade socket 17. As shown in FIGURES 1 to 5, the support member 45 extends a limited distance through the blade portion 10 and terminates in an outer end portion 46. Preferably, the inner core support member 45 is composed of a lightweight moldable material such as polyurethane foam, which may be effectively formed in place within the root end socket 17 (see FIGURE 8).

Additionally, the support member or core mandrel 45 incorporates a kick rib element 47 therein (see FIGURE 4) to cooperate with the spar plies 42 and 44 in absorbing kick loads imposed on the blade. The kick rib 47 is preferably formed of plies of reinforced plastic material laid in biased relation similar to the skin 15 (see FIGURES 9 and 10) and positioned in the support 45 in transverse relation to the major longitudinal axis of the blade portion 10 (see FIGURE 4). It should be understood that the "kick" forces are a result of centrifugal forces. Since the reinforcing filaments of the spar are not formed in a straight line when the spar is bonded but conform to the desired contour (see FIGURES 2 to 4), centrifugal forces thereon tend to urge the filaments to straighten into a straight line. Accordingly, these "kick" forces tend to compress the spar.

The plies 42 are interpositioned between the spar plies 44 and internal blade structure such as the root end socket 17 and the support member 45. However, the plies 42 only extend from the blade socket 17 to the end 46 of the support member 45. The plastic material composed of the plies 42 has, for its main purpose, the absorption of torsional loads imparted by the blade to the root end socket 17, and each of the plies 42 is reinforced with unidirectional filaments. The filaments of adjacent plies are arranged in biased relation similar to the skin 15 (see FIGURES 9 and 10) so as to most effectively withstand the torsional loads applied thereto.

As may be seen by reference to FIGURE 8, a circular, rubber-like grommet 50 is interpositioned between the outer end of the blade socket 17 and the bias-laid plies 42. The main purpose of the grommet 50 is to insure that the forces arriving from the plastic blade by way of the plies 42 are distributed into a greater portion of the root end socket 17 rather than merely into the outboard end thereof. Of course, the grommet 50 may also be formed of other materials, which have a low modulus of elasticity such as plastic or resinous materials reinforced with unidirectional filaments aligned in the direction of grommet periphery.

As may be understood by reference to FIGURE 5, a plastic filler 52 extends from the inboard end of the blade portion 10 to the end 46 of the support 45 and between opposite skin portions 39. Accordingly, the filler 52 lends added strength to the spar along the inboard end of the blade portion as it opens to a "C"-spar as well as lending added rigidity and vertical strength to the blade between the upper and lower skin layers 39. In this general relation, it may be noted by reference to the spar cross-section in FIGURES 2 to 7, that the spar assembly affords the desired strength, weight, and stiffness r the blade throughout its length by selective orientation the plies 42 and 44, and the filler 52 so as to most effectively withstand various stresses and loading imposed 1 the blade. Additionally, it should be understood that e plies 42, the filler 52, the spar plies 44, and the plies f the skin 15 are bonded together into unitary relation.

It should be understood that the term "spar assembly," employed herein, refers to one or more of the following: the spar support member 45, the kick rib 47, and ie plies 42 and 44, and the filler 52. Additionally, it iould be understood that the term "adjacent," as utilized i the description of the relative positions of plies of lastic material, should not be limited to the juxtaposed ly. That is, while it is preferable to position plies of the cin 15 at a bias with respect to juxtaposed plies, the arangement of the plies may be varied as desired. Accordingly, for example, a first preselected number of plies, which are laid in juxtaposed relationship, may employ inforceable filaments that extend unidirectionally with espect to each other, and a second preselected number f plies "adjacent" to the first preselected number may mploy reinforcing filaments, which are unidirectional ith respect to each other but laid on a bias with respect to the filaments of the "adjacent" first preselected umber of plies.

The remainder of the blade portion 10 is preferably illed with the cellular core 18, which is placed within the par and the skin 15. At the inboard end of the blade iortion 10, the core or core section 18 is positioned directly between the filler 52 and the trailing edge wedge 9 as shown in FIGURE 5. Outboard of the end 46 of he support member 45, the core or core section 18 is iositioned within the skin 15 and the plies 44, which :omprise the spar (see FIGURES 6 and 7).

As shown in FIGURES 1 and 14, the core section 18 preferably is comprised of a series of spaced honeycomb panels 56 being interconnected by transverse ribs 57 bonded to the ends of the panels 56. The panels 56 are defined by a series of interconnected vertically extending cells 58, and each of the ribs 57 is defined by a series of horizontally extending cells 59, which extend perpendicularly to the cells 58 of the panels 56. The cells 59 are bonded to plates 53 and 54, forming "sandwich" panels, which are bonded to the panels 56; however, the ribs 57 may comprise a single sheet of material if desired. It should be understood that the panels 56 may decrease in width as the honeycomb extends outboard from the inboard end thereof to provide added strength as the skin 15 and spar 16 taper.

The core 18 is captivated within the spar and the skin 15 of the blade by the trailing edge wedge 19, which is bonded between the trailing ends 40 of the skin layer 15. Of course, since the trailing edge wedge 19 need not absorb torsional stresses, it also is preferably formed of a plurality of plies of plastic material, which are reinforced by a plurality of unidirectionally extending filaments in a manner similar to the plies 44 (see FIGURES 11 and 12).

As clearly illustrated in FIGURE 1, the root rib 20 is positioned at the inboard end of the blade portion 10 (see FIGURE 4) to close the inboard end of the blade; the tip end assembly 21 includes a transversely disposed tip rib 60 similar to the root rib 20 to close the tip end of the blade portion. Additionally, the tip rib 60 supports the tip end assembly 21 in connected relation to the blade. Both the root rib 20 and the tip rib 60 are preferably formed of a plastic material reinforced with unidirectional filaments arranged in biased relation so as to lend some additional support and transverse rigidity to the blade in a manner similar to the skin 15 (see FIGURES 9 and 10).

The tip end assembly 21 mounted on the tip rib 60 includes tracking weights 62 and 63 attached to the tip rib 60 by means of brackets 64 and studs 65. Additionally, the stop member 27 also is fixedly secured to the tip rib 60 along the leading edge of the tip end assembly 21 to secure the outboard end of the balance rod 13 by means of a plurality of fasteners 66. Protection of the outermost end of the tip end assembly 21 and the outboard end of the blade portion 10 is achieved by means of a skin or cover 68, which also is constructed of plastic material reinforced with filaments laid on a bias. The tip cover 68 is attached to the blade by a plurality of fasteners such as screws, which are inserted through apertures 70 to engage the studs 65 and by a screw 70', which secures the trailing edge portion of the cover 68.

As seen in FIGURE 1, a clamp 22 is secured over the root end of the spar assembly and over the hour-glass portion of the root end socket 17 in order to insure a strong structural support thereof. The clamp 22 includes a plurality of attachments such as ears 75 for receiving fastening means. The ears 75' and 75" are also adapted to serve as a means for attachment to a damper arm (not shown). If a connection to a damper arm is not necessary, it is apparent that other suitable means may be substituted for the clamp 22. That is, for example, filament wound reinforced plastic preferably wound on a bias could be suitably employed to achieve the desired hoop stress and support in hour-glass area.

In forming the rotor blade structure, the root end portion 12 and the blade portion 10 are preferably formed and bonded into unitary relation within a single mold. Reference may be made to a copending application of Robert J. Ford and George H. Guckes entitled Molding Apparatus, Serial No. 257,647, filed concurrently herewith and assigned to the assignee of this application, for a more detailed description of a mold and forming mandrels used in conjunction therewith which are adapted for use in the formation and construction of the plastic rotor blade of this invention. Accordingly, FIGURES 12 to 15 illustrate only so much of the mold and forming mandrels as are necessary for an understanding of the method carried out in constructing a rotor blade.

In the initial stage, the parts comprising the leading edge assembly, except for the removable balance rod 13, are bonded together in a mold 80 as represented in FIGURE 16. Prior to assembly in the mold 80, the parts are chemically cleaned, and an adhesive, such as an epoxy resin, that is compatible with the leading edge elements is applied thereto. Then, in succession, the abrasion strip 30, the nose portion 24, the plastic filler 36, and the mass balance weight 35 are symmetrically located along the bottom or leading end surface of the mold cavity and against a mold liner 82.

A forming mandrel 83 is then clamped within the mold 80 to apply a downward uniform pressure against the leading edge assembly. Sufficient bonding pressure is applied to the mandrel 83 to insure a good bond as the mold is heated to an elevated temperature. For purposes of example, the bonding pressure may be about 30 to 40 pounds per square inch and the temperature approximately 330° F. After bonding, the leading edge assembly 14 is cleaned and prepared for the second step in which the skin 15 is formed and bonded to the leading edge assembly 14.

The outer skin layer 15 is formed by positioning plies of the plastic reinforced material symmetrically within the mold and with the reinforcing filaments arranged in biased relation to one another (see FIGURES 9 and 10). That is, rather than laying the plastic so that the filaments of adjacent plies are unidirectional to one another, the filaments or strands in the plies extend at a preselected angle on the order of 90 degrees with respect to the filaments of the adjacent plies. In this manner, the high strength characteristics of the material are not wasted in directional regions of low stress as would be the case in using fabric or woven reinforcing materials. Additionally, as best seen from FIGURE 13, the plies are staggered along the length of the blade so that the skin thickness tapers outwardly from the inboard end to the tip end and is regulated to afford the desired stiffness and weight to the skin 15 and the blade portion 10.

In assembled relation within the mold 80, the plies of the skin 15 are located symmetrically about the center line of the mold with the leading end surface 38 abutting against the leading edge assembly 14. The sides 39 and the trailing ends 40 of the skin 15 extend upwardly along opposite sides of the mold cavity and the liner 82 so that the skin 15 is cured into the rotor blade configuration.

In the molding operation of the skin 15, a forming mandrel having a pressure bag 85 and stringer 86 therein is positioned within the plies of the skin 15 and clamped to the upper or trailing end of the mold, which is partially closed. Again, the molding is carried out under the application of heat and pressure. Additionally, steam pressure or other suitable pressure medium is applied within the pressure bag at a pressure, for example, of 30 pounds per square inch at approximately 330° F. Accordingly, the plastic skin 15 is forced outwardly against the contour of the mold. Thus, the skin 15 assumes the desired shape, and the leading end portions 38 thereof are bonded to the leading edge assembly 14. However, it should be understood that the trailing ends 40 of the skin 15 are not bonded together and, accordingly, provide an entrance for subsequent insertion of the spar assembly, the core 18, the root and tip ribs 20 and 60, and the trailing edge wedge 19.

The spar assembly is desirably formed by first molding the inner support member 45 into connected relation with the root end socket 17 and has the kick rib or spar rib 47 incorporated therein. As previously described, the support 45 primarily serves as a former for the purpose of locating and positioning the plies 42 and 44 in desired relation and extends from the root end of the spar to the outboard end 46 of the support 45 (see FIGURE 1). The support member 45 is preferably formed of a foam or other cellular material having sufficient density and strength to sustain the spar plies 42 and 44 during molding and the ability to withstand bonding temperatures.

During the step of curing the spar, a separate forming mandrel 88 is used in cooperation with and outboard of the support 45 for locating and positioning the outboard plies 44 in desired relation. After the plies 42 are laid upon the root end socket 17 and the support member 45, the plies 44 are applied and located over the root end socket 17, the support member 45, and the outboard mandrel 88. Of course, the plies 44 outboard of the support 45 are staggered lengthwise along the mandrel 88 in much the same manner as the skin 15 so as to be of outwardly tapering thickness. However, in laying the plies 44 along the core support 45 and the mandrel 88, the reinforcing filaments of adjacent plies are oriented in unidirectional, longitudinally extending relation (see FIGURES 11 and 12).

The entire assembly is then inserted into the mold with the outer, leading edge of the assembly abutting against the inner surface of the skin 15 (see FIGURE 18). Again, the upper end of the forming mandrel 88 is clamped to the upper or trailing end of the mold 80. Thereafter, the mold 80 is heated to an elevated temperature of about 330° F., and pressure of, for example, 30 to 40 pounds per square inch is applied through the forming mandrel 88 in cooperation with the mold 80. Following completion of the cure, the assembled spar, skin, and leading edge sections are allowed to cool before removal from the mold 80 for cleaning and preparation for the final molding step.

In the final stage, the assembled and molded sections of the blade are removed from the mold and are positioned in a separate support stand (not shown) in a manner to hold the trailing ends 40 of the skin 15 open to a sufficient extent to permit insertion of the core 18. Prior to insertion, the core 18 is treated with an adhesive such as epoxy resin for subsequent bonding within the skin 15. Thereafter, the root rib 20 and the tip rib 60 are secured to the inboard and outboard ends, respectively, of the assembled blade portion 10, and the trailing edge wedge 19 is positioned between the trailing portions 40 of the skin 15. It should be understood that the root rib 20, the tip rib 60, and the trailing edge wedge 19 are preferably pre-formed and then bonded together in the final stage of the molding operation.

Upon assembly of the parts, the blade structure is inserted into the mold to assume the relationship as shown in FIGURE 19, and sufficient heat and pressure are applied to insure complete bonding, especially between the skin 15, the core 18, the root rib 20, the tip rib 60, and the trailing edge wedge 19. To insure proper bonding of the honeycomb core 18 to the interior surfaces of the spar and the skin 15, a vacuum pressure bag may be wrapped about the spar and skin assembly to evacuate the cells of the honeycomb core 18.

Since the vacuum pressure will exert forces perpendicular to the surfaces of the blade, such pressure will have both parallel and perpendicular components of force with respect to the longitudinal axes of the honeycomb cells 58. However, a small area extending spanwise of the blade and in a substantially central region of the blade chord, where the skin 15 extends perpendicular to the longitudinal axes of the honeycomb cells 58, is free of such a perpendicular component. While, the honeycomb cells 58 are capable of withstanding the component of force, which is parallel to the longitudinal axes thereof, the perpendicular component has a tendency to cause the honeycomb core 18 to collapse towards the above mentioned central region of the blade chord. However, the ribs 57, which are bonded between the core panels 56, add strength in the direction of the component perpendicular to the axes of the honeycomb cells and overcome the tendency of the core 18 to collapse.

Following the final stage operation, the blade is permitted to cool and then removed from the mold and trimmed. Thereafter, the balance rod 13, the tracking weights 62 and 63, the tip cover 68, a trim tab 72, and the clamp 22 are installed.

It should be understood that, depending upon the composition of the various sections, a number of steps may be combined or altered. That is, the steps (A) bonding the leading edge assembly, (B) forming the skin section, (C) forming the spar assembly, and (D) bonding the core, root and tip ribs, and trailing edge wedge may be combined in a single step. Additionally, steps (A), (B), and (C) may be combined or steps (A) and (B) may be combined while steps (C) and (D) are or are not combined as desired. In this manner, several or all of the mandrels may not be employed. However, great care is necessary to insure that the components of the blade are assembled into proper relative position prior to bonding. It is generally preferred to pre-form the spar assembly and to mold it separately to the assembled leading edge assembly 14 and skin 15. Additionally, it is desirable to avoid the combination of steps (B) and (C) to insure that sufficient pressure is applied against the internal surface of the skin for forming into its desired contour. Furthermore, it is preferable to conduct step (D) separately since the more interior filaments of the plastic reinforced material of the skin 15 may have the tendency to take on the external configuration of the honeycomb core and some of the filaments may be forced into the honeycomb core cell cavities. However, as this invention contemplates, if step (D) is combined with other steps, the core 18, which may for example be polyurethane foam or other cellular material, requires sufficient stiffness to support the skin 15 and other blade components during bonding and to maintain proper pressure on the skin during bonding without damaging the filaments thereof. However, it should be understood that core material having a higher density with respect to honeycomb may cause undesirable blade balancing problems.

From the foregoing, it can be clearly understood that the rotary blade of this invention and the method therefor encompass numerous advantages hitherto unavailable. That is, the plastic blade of this invention is low in cost, non-corrosive, and has improved fatigue properties since there is less vulnerability to the occurrence of notches therein. Additionally, the blade is light in weight, and aerodynamically smooth. Of course, the capability of blade balancing, subsequent to formation of the blade, is an advantage of high importance in the art of rotary blades. That is, it can readily be seen that the feature of a removable balance weight allows incremental forming of the weight along the length thereof for accurate blade balancing. This is particularly true of the use of a rod as the balance weight since it may be formed easily by turning. When a removable balance weight is not employed the blade balance must be calculated prior to forming, which, of course, is less accurate than balancing after blade formation.

For purposes of exemplification, a particular embodiment of the invention has been shown and described according to the present understanding thereof. However, it will be apparent that changes and modifications in the arrangement and construction of the parts thereof may be resorted to without departing from the spirit and scope of the invention.

We claim:

1. In a structure of airfoil contour, a longitudinally extending rotor spar assembly having an inboard connecting end portion of generally elongated cylindrical configuration, a first series of plies of reinforced plastic material arranged in surrounding relation to said connecting end portion and positioned in biased relation to absorb torsional forces, and a second series of plies arranged in surrounding relation to said first series of plies and extending longitudinally outwardly from said connecting end portion along the length of said structure, said longitudinally extending series of plies being reinforced with unidirectional and longitudinally extending non-woven filaments to absorb centrifugal forces imparted to said structure.

2. In a structure as claimed in claim 1, wherein said second series of plies of said spar assembly undergo a gradual cross-sectional transition from a generally circular configuration at the inboard end to a generally arcuate configuration as said second series of plies extend outwardly from said inboard end.

3. A composite rotor blade structure adapted for use in rotary wing aircraft comprising a cover layer including reinforced moldable material, a leading edge assembly, a spar assembly substantially traversing the length of the blade structure and including plies of reinforced moldable material, a core bonded to said spar assembly and to said cover layer, said core comprising a plurality of panels providing support in a first direction and a plurality of support means bonding said panels together and providing support in a second direction substantially perpendicular to said first direction, root end means for providing support to said blade structure, said root end means being engaged with said spar assembly, and support means for further holding said root end means and said spar assembly in engagement, said spar assembly and said leading edge assembly being bonded to said cover layer.

4. A composite rotor blade structure adapted for use in rotary wing aircraft comprising a cover layer including reinforced moldable material, a spar assembly substantially traversing the length of the blade structure and including plies of reinforced moldable material, said cover layer being formed separate from said spar assembly, a leading edge assembly formed separate from said spar assembly and said cover layer, a core formed separate from said cover layer, said spar assembly and said leading edge assembly, said core being bonded to said spar assembly and to said cover layer, root end means for providing support to said blade structure, said root end means being separate from said spar assembly and engaged with said spar assembly, said root end means including an irregularly shaped root end connection means for allowing said moldable material of said spar assembly to be formed in complementary relation to said root end connection means along a surface juxtaposed to said root end connection means, and a cylindrical clamp surrounding a substantially cylindrical periphery of said spar assembly for clamping said spar assembly to said root end connection means to further hold said root end means and said spar assembly in engagement, said spar assembly and said leading edge assembly being bonded to said cover layer.

5. A composite rotor blade structure adapted for use in rotary wing aircraft comprising a cover layer including reinforced moldable material, a spar assembly substantially traversing the length of the blade structure and including plies of reinforced moldable material, said cover layer being formed separate from said spar assembly, a leading edge assembly forced separate from said spar assembly and said cover layer, a core formed separate from said cover layer, said spar assembly, and said leading edge assembly, said core being bonded to said spar assembly and to said cover layer, said core comprising a plurality of panels providing support in a first direction and a plurality of support means bonding said panels together and providing support in a second direction substantially perpendicular to said first direction, root end means for providing support to said blade structure, said root end means being separate from said spar assembly and engaged with said spar assembly, and support means for further holding said root end means and said spar assembly in engagement with each other, said spar assembly and said leading edge assembly being bonded to said cover layer.

6. A composite rotor blade structure adapted for use in rotary wing aircraft comprising a cover layer, a leading edge assembly, a spar assembly substantially traversing the length of the blade structure, a core bonded to said spar assembly and to said cover layer, root end means for providing support to said blade structure, said root end means being engaged with said spar assembly, said spar assembly comprising a first plurality of plies of reinforced plastic material arranged in surrounding arrangement to said root end means in biased relation with respect to each other to absorb torsional forces and a second plurality of plies of plastic material arranged in surrounding relationship to said first plurality of plies, said second plurality of plies being reinforced with unidirectional and longitudinally extending non-woven filaments and extending substantially along the length of the blade, support means for further holding said root end means and said spar assembly in engagement, and said cover layer comprising a plurality of plies of reinforced plastic material in biased relationship to adjacent plies thereof and traversing at least a portion of said spar assembly, said plies of said spar assembly and said plies of said cover layer being in bonded relationship to form said rotor blade structure, said spar assembly and said leading edge assembly being bonded to said cover layer.

7. A composite rotor blade structure adapted for use in rotary wing aircraft comprising a root end connection member; a longitudinally extending spar assembly separate from said root end connection member, said spar assembly including, support means connected to said connection member and being in overlapping relation, said spar assembly including longitudinally extending moldable material traversing the substantial length of said blade structure outwardly of said connection member and incorporating non-woven filaments therein oriented unidirectionally in longitudinal direction to absorb centrifugal forces imparted to said blade, said moldable material being bonded to said support means; a leading edge assembly being disposed along one side of said spar assembly; a light weight core being disposed along a second side opposite said one side of said spar assembly and cooperating with said leading edge assembly and said spar assembly to define an outwardly tapering blade of airfoil contour; and a skin layer enclosing said core and at least a portion of said spar in bonded relationship.

8. A composite rotor blade structure adapted for use in rotary wing aircraft comprising a root end connection member; a longitudinally extending spar assembly separate from said root end connection member, said spar assembly including a spar support member connected to said root end connection member, longitudinally extending plastic material traversing the substantial length of said blade structure outwardly of said connection member, said plastic material incorporating non-woven filaments therein being oriented unidirectionally in a longitudinal direction to absorb centrifugal forces imparted to said blade structure, reinforced plastic material between said longitudinally extending plastic material and said connection member to absorb torsional forces; said reinforced plastic material having layers of filaments in biased relationship with adjacent layers thereof; a leading edge assembly formed separate from said spar assembly, said leading edge assembly including a removable balance weight and being disposed along one side of said spar assembly; a light weight core being disposed along a second side of said spar assembly and cooperating with said leading edge assembly and said spar assembly to define an outwardly tapering blade of airfoil contour; and a skin enclosing said core and at least a portion of the longitudinally extending plies of said spar assembly in bonded relation.

9. A composite rotor blade structure as claimed in claim 8, wherein said skin comprises a plastic material having bias-laid non-woven filaments therein, said plastic material of said skin being tapered as said skin extends in a direction from said root end connection member.

10. A composite rotor blade structure as claimed in claim 8, wherein the longitudinally extending plastic material of said spar assembly is of arcuate cross-sectional configuration over a substantial extent thereof and is tapered as said spar assembly extends outwardly in a direction away from said root end connection member.

11. A composite rotor blade structure adapted for rotary wing aircraft comprising a root end socket of generally hour-glass shape; a longitudinally extending spar assembly including a spar support member of moldable material inserted at one end within said root end socket, longitudinally extending plies of reinforced plastic material substantially traversing the length of said blade structure outwardly from said root end socket and in surrounding relation to said spar support member, said longitudinally extending plies incorporating filaments oriented in a longitudinal direction to absorb centrifugal forces imparted to said blade structure, bias-laid plies of reinforced plastic material between said longitudinally extending plies and said spar support member and adjacent to said root end socket to absorb torsional forces; a leading edge assembly formed separate from said spar assembly, said leading edge assembly including a removable balance weight therein and being disposed along one side of said spar assembly; a core disposed along a second side of said spar assembly and cooperating with said leading edge assembly and said spar assembly to define a tapering blade; and a skin layer comprised of plies of reinforced plastic material enclosing said core and at least a portion of said spar assembly in bonded relation.

References Cited by the Examiner

UNITED STATES PATENTS

| | | | |
|---|---|---|---|
| 2,202,013 | 5/1940 | Lougheed. | |
| 2,303,707 | 12/1942 | Pullin. | |
| 2,588,570 | 3/1952 | Pitcairn | 170—159 |
| 2,621,140 | 12/1952 | Bitterli | 170—159 X |
| 2,659,444 | 11/1953 | Stanley | 170—159 |
| 2,674,327 | 4/1954 | Pullin et al. | 170—159 |
| 2,941,603 | 6/1960 | Jovanovich | 170—159 |
| 2,951,541 | 9/1960 | Hinds | 170—159 |
| 2,954,828 | 10/1960 | Marchetti | 170—159 |
| 3,000,446 | 9/1961 | Warnken | 170—159 |
| 3,004,607 | 10/1961 | Linnabery | 170—159 |
| 3,018,832 | 1/1962 | Prewitt | 170—159 |
| 3,021,246 | 2/1962 | Hutter et al. | 156—196 |
| 3,028,292 | 4/1962 | Hinds | 156—214 |
| 3,055,437 | 9/1962 | Stack | 170—159 |

FOREIGN PATENTS

| | | |
|---|---|---|
| 596,636 | 1/1948 | Great Britain. |
| 831,380 | 3/1960 | Great Britain. |
| 836,501 | 6/1960 | Great Britain. |
| 871,625 | 6/1961 | Great Britain. |
| 880,425 | 10/1961 | Great Britain. |

SAMUEL LEVINE, *Primary Examiner.*

ABRAM BLUM, JULIUS E. WEST, E. A. POWELL, JR., *Assistant Examiners.*